K. GAMMEL.
DRYING APPARATUS.
APPLICATION FILED FEB. 23, 1907.

932,695.

Patented Aug. 31, 1909.

Witnesses:
Wm. D. Bell.
A. Glatt.

Inventor,
Karl Gammel
by Gartner & Seward
attorneys

UNITED STATES PATENT OFFICE.

KARL GAMMEL, OF STUTTGART, GERMANY.

DRYING APPARATUS.

932,695.  Specification of Letters Patent.  Patented Aug. 31, 1909.

Application filed February 23, 1907. Serial No. 359,009.

*To all whom it may concern:*

Be it known that I, KARL GAMMEL, a citizen of the German Empire, residing at Stuttgart, in the Kingdom of Würtemberg, Empire of Germany, have invented certain new and useful Improvements in Drying Apparatus; and I do hereby declare the following to be a full, clear, and exact description of the invention, such as will enable others skilled in the art to which it appertains to make and use the same.

Several processes are already known in which the material to be dried is dried in closed cases or containers on stages or shelves or in suitable boxes, and a constant air current being caused to flow forward and upwardly through the material to be dried by means of a fan, or even by the movement of pistons.

The object of this invention is to provide a drying apparatus of simple, durable and strong construction, effective in operation, and easily handled.

The invention consists in the improved drying apparatus, in the means for producing a whirling or gyratory movement of the air to be used for drying, and forcing the air in that condition through the material to be dried, and in the combination and arrangement of the various parts thereof, substantially as will be hereinafter more fully described and finally embodied in the clauses of the claim.

Figure 1:
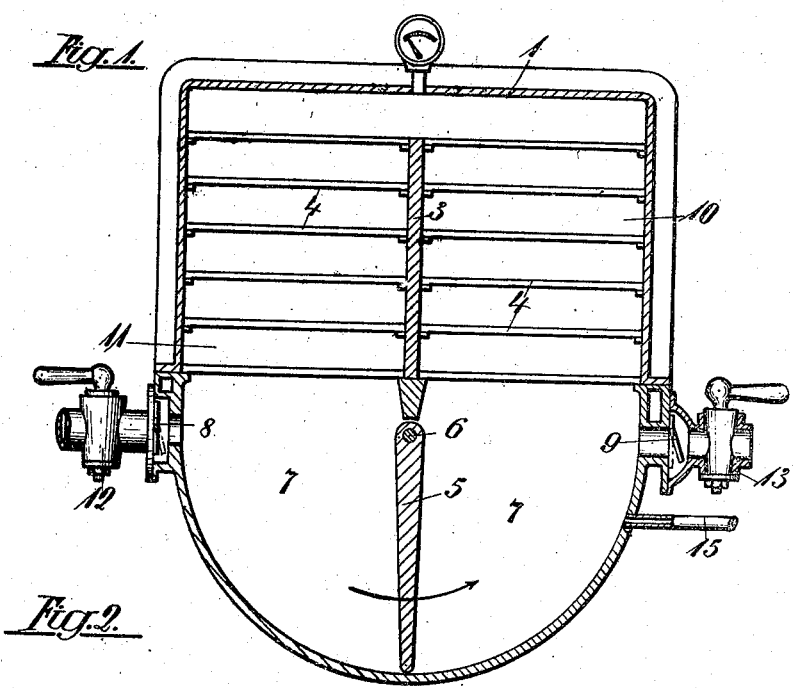
Figure 2:
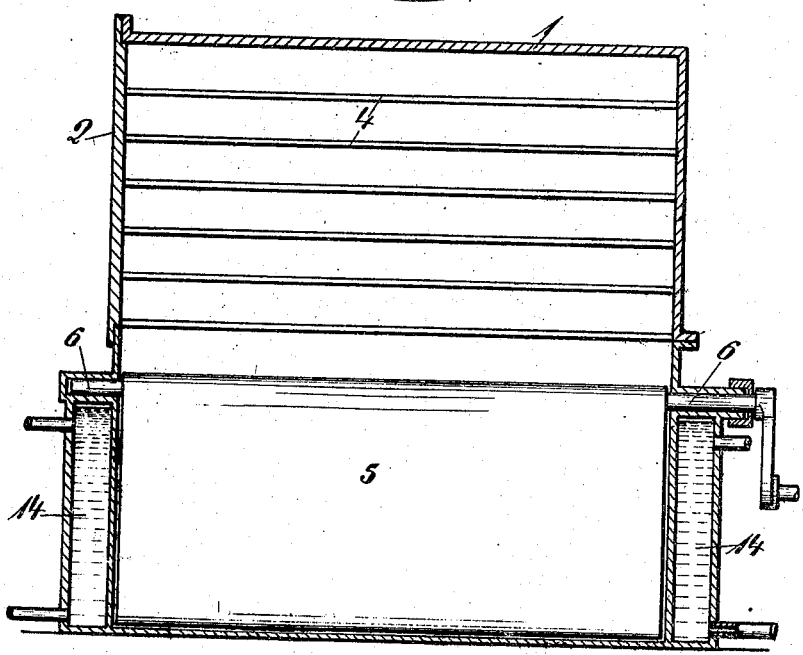

Referring to the accompanying drawings, in which like numerals of reference indicate corresponding parts in each of the figures: Figures 1 and 2 are respectively a cross sectional and a longitudinal sectional view of my improved apparatus.

The drawing shows an air tight case 1 which is provided with a door 2 through which the case 1 is fed with the material to be dried. The case is divided by means of one or more removable partitions 3 into separate chambers 10 and 11, while stages or shelves 4 are arranged one above the other within said chamber, as clearly shown.

Beneath the lowest layer of shelves, a wing or fly 5, adapted to be oscillated on shaft 6 by any suitable means, is provided in the chamber 7 which latter is formed by the lower part of case 1. By the oscillating movement of the fly or wing 5, the air contained in the chamber 7 on both sides of the wing 5 has a varying motion imparted to it, so that the two air currents within the drying chamber encounter one another at the most varying places, and a gyration or whirling of the air is produced, as will be hereinafter more fully described.

On one side of chamber 7 is arranged an air inlet provided with the stop cock 12 and a valve flap 8 (opening inwardly), while on the other side is arranged an air outlet, provided with the stop cock 13 and a valve flap 9 (opening outwardly). A pipe 15 is likewise arranged in the case 1 below the air outlet, to be connected with an air pump, should the drying be carried on under vacuum, as hereinafter described. Supposing the wing 5 is at its extreme left-hand position and is being moved from the latter—in the direction of the arrow—to its extreme right-hand position. By means of this movement the flap 8 is opened and fresh air is being sucked or taken in through cock 12—into chamber 7 (on the left of wing 5), where it intermingles with the air coming from chamber 11, and through said intermingling or mixing a whirling or gyratory movement is imparted to the said fresh air mixture. Simultaneously the flap 9 is opened, and the damp air in chamber 7 (on the right of wing 5) is discharged through cock 13, although a small portion of said damp air is again forced through the material to be dried. On the return movement of wing 5, the fresh air mixture now filling the entire chamber 7, and which air mixture is in a whirling or gyratory movement, is forced through chambers 11 and 10, where it dries the material contained in said chambers. It will be understood that during the return movement of wing 5 (from right to left) both flaps 8 and 9 are closed.

If the drying is to be carried on under vacuum, the two cocks 12 and 13 are closed and air and moisture are withdrawn from the drying chamber by means of an air pump to be attached to pipe 15. By means of said air pump, steam is also withdrawn from the chamber, and the degree of moisture and the vacuum may be suitably regulated in the manner preferable for the material to be dried.

The necessary heat for evaporating the water contained in the material to be dried, is partly produced in the drying cases by the frictional resistance of the air itself, and also heat appliances 14 of any suitable construction may be provided in the walls of the drying case, for instance in the chamber 7 and may be provided with any suitable means for regulating the heat.

What I claim as new and desire to secure by Letters Patent is:

1. In a drying apparatus, the combination, with the drying chamber having inlet and outlet openings, of means for effecting a reciprocating but general advancing movement of the drying fluid through said chamber, substantially as described.

2. In a drying apparatus, the combination, with the drying chamber, of means for causing the drying fluid to be advanced in said chamber and to simultaneously reciprocate, substantially as described.

3. In a drying apparatus, the combination of the drying chamber, a wall dividing the same into separate compartments and affording relatively limited communication between said compartments, a valved inlet opening and a valved outlet opening for the chamber and a wing movable back and forth alternately toward each compartment, substantially as described.

4. In a drying apparatus, the combination of the drying chamber, a wall dividing the same into separate compartments and affording relatively limited communication between said compartments, a valved inlet opening and a valved outlet opening for the chamber and an oscillatory wing arranged in said chamber and having its axis of movement substantially in the plane of said wall, substantially as described.

In testimony whereof I affix my signature in presence of two witnesses.

KARL GAMMEL.

Witnesses:
HERMANN HOPPE,
ERNEST ENTENMANN.